United States Patent [19]

Klatt

[11] Patent Number: 4,570,502

[45] Date of Patent: Feb. 18, 1986

[54] GEARSHIFT LEVER ARRANGEMENT TO CONTROL THE SPEED OF SHIFTING GEARS IN POWER-ASSISTED TRANSMISSION

[75] Inventor: Alfred Klatt, Wathlingen, Fed. Rep. of Germany

[73] Assignee: WABCO Westinghouse Fahrzeugbremsen GmbH, Hannover, Fed. Rep. of Germany

[21] Appl. No.: 538,443

[22] Filed: Oct. 3, 1983

[30] Foreign Application Priority Data

Oct. 15, 1982 [DE] Fed. Rep. of Germany ....... 3238219

[51] Int. Cl.$^4$ ............................................. B60K 20/02
[52] U.S. Cl. ...................................... 74/335; 74/365; 74/473 R
[58] Field of Search ...................... 74/335, 365, 473 R

[56] References Cited

U.S. PATENT DOCUMENTS

| | | | |
|---|---|---|---|
| 3,650,161 | 3/1972 | Ito et al. | 74/335 |
| 3,732,755 | 5/1972 | Beig et al. | 74/365 |

Primary Examiner—William A. Cuchlinski, Jr.
Attorney, Agent, or Firm—G. J. Falce

[57] ABSTRACT

A transmission gearshifting arrangement in which the gearshift lever is provided with a normal shift position and a fast shift position, the latter resulting in relative motion between the gearshift lever and a cam plate. This relative motion produces closure of a fast shift switch to signal the electronic evaluation circuit of the desired fast shift. In the absence of a signal, a normal shift speed is indicated. A pressure control valve capable of producing a bilevel rate or pressure is controlled by the evaluation circuit to cause a power cylinder to effect the gearshifting at either a normal or a fast speed.

8 Claims, 1 Drawing Figure

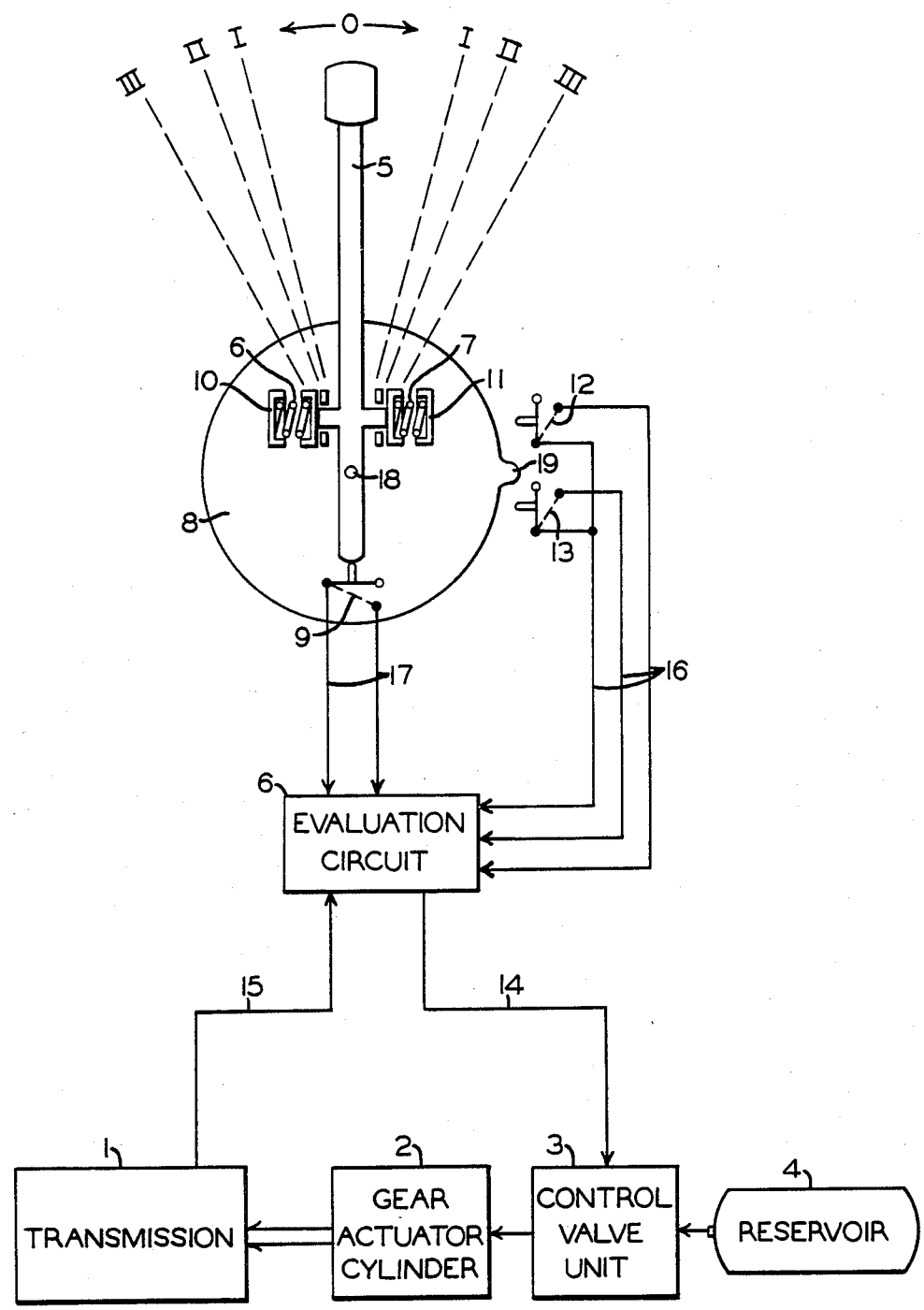

GEARSHIFT LEVER ARRANGEMENT TO CONTROL THE SPEED OF SHIFTING GEARS IN POWER-ASSISTED TRANSMISSION

BACKGROUND OF THE INVENTION

The present invention relates to a power-assisted vehicle transmission and, particularly, to a power-assisted transmission in which the speed of gear shifting may be controlled.

In German Pat. Application Ser. No. DE-OS 27 42 032, there is disclosed a power-assisted transmission, the gear engagement of which is effected by either hydraulic or pneumatic power cylinder actuators. Such arrangements are advantageous, particularly in relatively heavy commercial-type vehicles, where excessive gearshift lever forces would otherwise be required to effect engagement of the gears during shifting.

It has been found that under certain driving conditions, such as in ascending steep grades, the speed at which the power actuators effect the gear shifting is too slow. This results in the vehicle losing excessive speed during the shifting period.

While it is possible to increase the force of shifting to obtain faster response during grade shifting by increasing the size of the power-assist cylinders, or by increasing the actuating pressure, this would result in excessive shifting forces under normal conditions and, accordingly, excessive gear wear, since under normal conditions increased shifting forces to obtain faster gear shifting is unnecessary.

SUMMARY OF THE INVENTION

The object of the present invention, therefore, is to provide a transmission gear shifting arrangement in which the operator can selectively obtain either a normal or a fast shift of the gears, as desired, through the gearshift lever.

This is achieved by arranging the gearshift lever to operate a fast shift switch when moved beyond a position in which a normal speed switch is actuated. The fast shift switch provides a signal to the evaluation circuit normally employed in a gearshift control system, which in turn signals a control valve via which fluid under pressure is connected to the transmission power-assist actuator cylinder. The control valve establishes either a fast or normal speed of shifting by supplying more or less pressure to the power-assist actuator cylinder by throttling, pulsing, or timing control means.

BRIEF DESCRIPTION OF THE DRAWING

Other objects and advantages of the invention will become apparent from the following more detailed explanation of the invention when taken with the single FIGURE drawing showing the gearshift lever arrangement in diagrammatic form and the remaining known or conventional devices in block outline form.

DESCRIPTION AND OPERATION

Power-assisted transmissions, such as transmission 1, are known in the art. These transmissions shift their gears through the force of a power-actuator cylinder 2, which is supplied with pneumatic pressure from a reservoir 4 via an intermediate control valve unit 3. An electronic evaluation circuit 6 sends a normal or fast shift signal to control valve unit 3 over a line 14 in accordance with information received over a line 15 with respect to the driving phase of the vehicle and via lines 16 with respect to the position of a shift command generator in the form of gearshift lever 5.

Gearshift lever 5 is mounted so as to rotate about a pivot point 18 about which a cam plate 8 is also rotatable. Two micro-switches 12,13 serve to indicate the desired gear to be engaged. These switches are actuated by a cam 19 formed on cam plate 8. Semiconductor elements (not shown) may be employed as an alternative to micro-switches 12,13. For the sake of simplicity, only one plane of a conventional H configuration gearshift arrangement is shown.

In a normal shifting operation, gearshift lever 5 is moved to position I by the operator. Cam plate 8 is connected to lever 5 through springs 6 and 7, one end of which bears against a respective seat 10 and 11 formed on cam plate 8, and the other end of which is engageable with lever 5. Thus, spring 6 or 7 is initially effective to cause cam plate 8 to rotate with gearshift lever 5, whereby cam 19 actuates one of the micro-switches 12,13 depending upon the direction of rotation. Consequently, evaluation control circuit 6 is supplied with signals via lines 16 to cause the desired gear to be engaged. A locking device (not shown) limits rotation of cam plate 8 in position I of gearshift lever 5 until actual gear engagement has been completed, as disclosed in co-pending application, Case No. 8177. Once engagement of the gears has been completed, the locking device becomes disengaged to permit movement of gearshift lever 5 through position II and into position III. This movement of gearshift lever 5 into position III, following initial movement to position I or II, simply provides the operator with a signal that the power-assisted engagement of the transmission gears has been completed.

In order to rapidly shift gears, such as when shifting gears while ascending a grade, the gearshift lever 5 is moved directly through position I and into position II. Since rotation of cam plate 8 is limited to that obtained during rotation of lever 5 to position I by the locking device mentioned above, further movement of gearshift lever 5 to position II results in movement of lever 5 relative to cam plate 8. Since spring 6 or 7 is therefore no longer able to drive the locked cam plate 8, the lever 5 must be moved to position II with sufficient force to compress spring 6 or 7. In position II, the movement of lever 5 relative to cam plate 8 effects closure of a fast shift micro-switch 9, which, in turn, provides a fast shift signal on line 17 between switch 9 and evaluation circuit 6. Fast shift switch 9 may alternatively be in the form of a semiconductor-type switch. This fast shift information causes evaluation circuit 6 to output a signal to control valve unit 3 via line 14 to cause the valve unit 3 to adjust either the level of fluid pressure or the rate of fluid pressure supplied to power-actuator cylinder 2.

For example, the fluid pressure supplied to the power-actuator cylinder 2 by the control valve unit 3 can be provided in pulses to obtain a normal gear shift or in an unpulsed or steady flow when a faster-than-normal gear shift is desired.

Alternatively, control valve unit 3 may be of such type as to provide a throttled flow of fluid pressure to obtain a normal gear shift or an unthrottled flow of fluid pressure when a faster-than-normal gear shift is desired.

The foregoing are alternative examples of ways in which two rates of pressure buildup may be obtained to control the gear shifting speed of operation. It is also possible to control the gear shifting speed by providing two pressure levels.

Control valve unit 3, in this case, may be of such type as to include a pressure switch (not shown) by means of which the pressure buildup at power-actuator cylinder 2 is terminated at a lower pressure threshold when a normal shift is desired than in the case where a fast shifting is desired.

Alternatively, it is also possible to control the pressure supplied to power-actuator cylinder 2 by means of a timing element (not shown) associated with evaluation circuit 6, so that, for a normal shifting, the signal on line 14 is terminated sooner than for a fast shift operation. This results in a lower pressure being supplied by control valve unit 3 for a normal shift and a higher pressure for a faster-than-normal shift.

The present invention is applicable for H-shift configurations, as well as linear and step-by-step shifting arrangements, the particular advantage of the invention being that the driver does not have to operate a switch or the like independently of the gearshift lever in order to obtain a fast shift.

I claim:

1. A gearshift arrangement for controlling the speed at which the gears of a power-assisted transmission are shifted into engagement comprising:
   (a) power-actuator means for effecting said shifting of said gears;
   (b) shift command generator means for selecting the shifting of said gears at either a normal speed or at a faster-than-normal speed;
   (c) evaluation means for monitoring said shift-command generator means to determine the selected gearshifting speed; and
   (d) valve means subject to said evaluation means for controlling said power-actuator means so as to effect said shifting of said gears at the speed selected by said gearshift means.

2. A gearshift arrangement as recited in claim 1, wherein said valve means is operative to supply either a normal rate or a higher-than-normal rate of fluid under pressure to said power-actuator means according to the selected normal or faster-than-normal speed of gear shifting, respectively.

3. A gearshift arrangement as recited in claim 2, wherein said normal rate corresponds to a pulsed supply of fluid under pressure to said power-actuator means and said faster-than-normal rate corresponds to an unpulsed supply of fluid under pressure to said power-actuator means.

4. A gearshift arrangement as recited in claim 2, wherein said normal rate corresponds to a throttled supply of fluid pressure to said power-actuator means and said faster-than-normal rate corresponds to an unthrottled supply of fluid under pressure to said power-actuator means.

5. A gearshift arrangement as recited in claim 1, wherein said valve means is operative to supply fluid under pressure to said power-actuator means at either a predetermined pressure threshold or at a pressure threshold greater than said predetermined threshold according to the selected normal or faster-than-normal speed of gearshifting, respectively.

6. A gearshift arrangement as recited in claim 5, wherein said valve means includes pressure switch means for limiting said supply of fluid under pressure to said power-actuator means at a pressure value corresponding to said predetermined threshold.

7. A gearshift arrangement as recited in claim 5, wherein said evaluation means includes timing means for controlling the duration of operation of said valve means.

8. A gearshift arrangement as recited in claim 1, wherein said shift command generator means comprises:
   (a) a gearshift lever rotatably operable to a first position and a second position in a given direction of rotation;
   (b) a cam plate having limited rotation with said gearshift lever to said first position;
   (c) spring means between said gearshift lever and said cam plate for effecting said limited rotation of said cam plate with said gearshift lever;
   (d) a normal shift speed switch connected to said evaluation means;
   (e) cam means on said cam plate for effecting closure of said normal shift speed switch in said first position of said gearshift lever; and
   (f) a fast shift speed switch carried partly on said lever and partly on said cam plate, and connected to said evaluation means, said gearshift lever being rotatable from said first position to said second position relative to said cam plate, whereby said relative motion therebetween effects closure of said fast shift speed switch.

* * * * *